(12) United States Patent
Yosui

(10) Patent No.: US 9,558,384 B2
(45) Date of Patent: Jan. 31, 2017

(54) ANTENNA APPARATUS AND COMMUNICATION TERMINAL INSTRUMENT

(71) Applicant: Murata Manufacturing Co., Ltd., Nagaokakyo-shi, Kyoto-fu (JP)

(72) Inventor: Kuniaki Yosui, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 539 days.

(21) Appl. No.: 13/706,409

(22) Filed: Dec. 6, 2012

(65) Prior Publication Data

US 2013/0099994 A1 Apr. 25, 2013

Related U.S. Application Data

(63) Continuation of application No. PCT/JP2011/067127, filed on Jul. 27, 2011.

(30) Foreign Application Priority Data

Jul. 28, 2010 (JP) ................................ 2010-169827

(51) Int. Cl.
*H01Q 19/10* (2006.01)
*G06K 7/10* (2006.01)
(Continued)

(52) U.S. Cl.
CPC .......... *G06K 7/10237* (2013.01); *H01Q 1/243* (2013.01); *H01Q 7/00* (2013.01); *H01Q 19/00* (2013.01); *H04B 5/0093* (2013.01)

(58) Field of Classification Search
CPC .......... H01Q 1/243; H01Q 7/00; H01Q 19/00; G06K 7/10237; H04B 5/0093
See application file for complete search history.

(56) References Cited

U.S. PATENT DOCUMENTS 3,364,564 A 1/1968 Kurtz et al.
4,794,397 A 12/1988 Ohe et al.
(Continued)

FOREIGN PATENT DOCUMENTS

CA 2 279 176 A1 7/1998
CN 101351816 A 1/2009
(Continued)

OTHER PUBLICATIONS

Kato et al.: "Wireless Communication Device and Metal Article"; U.S. Appl. No. 13/691,996, filed Dec. 3, 2012.
(Continued)

*Primary Examiner* — Trinh Dinh
(74) *Attorney, Agent, or Firm* — Keating & Bennett, LLP

(57) ABSTRACT

In an antenna apparatus, a power feed antenna includes a coil conductor and connected to a power feed circuit, a first booster conductor coupled to the coil conductor of the power feed antenna through an electromagnetic field, the first booster conductor having a planar plate shape, and a second booster conductor coupled to the first booster conductor through an electromagnetic field and coupled to the power feed antenna through an electromagnetic field. Thus, the antenna apparatus is much less influenced by nearby metallic objects and a shape of an included radiation plate may be more freely determined without requiring a highly accurate positional relationship between the radiation plate and the coil conductor.

12 Claims, 12 Drawing Sheets

(51) Int. Cl.
  *H01Q 1/24* (2006.01)
  *H01Q 7/00* (2006.01)
  *H01Q 19/00* (2006.01)
  *H04B 5/00* (2006.01)

(56) References Cited

U.S. PATENT DOCUMENTS

| | | |
|---|---|---|
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,104,611 A | 8/2000 | Glover et al. |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,243,045 B1 | 6/2001 | Ishibashi |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1 | 9/2002 | Porte |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 * | 1/2005 | Takasugi et al. ............. 235/492 |
| 6,861,731 B2 | 3/2005 | Buijsman et al. |
| 6,927,738 B2 | 8/2005 | Senba et al. |
| 6,956,481 B1 | 10/2005 | Cole |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 7,432,866 B2 * | 10/2008 | Cheng et al. ................. 343/702 |
| 2001/0011012 A1 | 8/2001 | Hino et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2002/0186004 A1 | 12/2002 | Prazeres da Costa et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2003/0206095 A1 | 11/2003 | Chaloner et al. |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0001031 A1 | 1/2005 | Akiho et al. |
| 2005/0007296 A1 | 1/2005 | Endo et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0133605 A1 | 6/2005 | Koyama et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0162331 A1 | 7/2005 | Endo et al. |
| 2005/0232412 A1 | 10/2005 | Ichihara et al. |
| 2005/0236623 A1 | 10/2005 | Takechi et al. |
| 2005/0253726 A1 | 11/2005 | Yoshida et al. |
| 2005/0275539 A1 | 12/2005 | Sakama et al. |
| 2006/0001138 A1 | 1/2006 | Sakama et al. |
| 2006/0032926 A1 | 2/2006 | Baba et al. |
| 2006/0044192 A1 | 3/2006 | Egbert |
| 2006/0055531 A1 | 3/2006 | Cook et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0114159 A1 | 6/2006 | Yoshikawa et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0208900 A1 | 9/2006 | Tavassoli Hozouri |
| 2006/0214801 A1 | 9/2006 | Murofushi et al. |
| 2006/0220871 A1 | 10/2006 | Baba et al. |
| 2006/0244568 A1 | 11/2006 | Tong et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0015549 A1 | 1/2007 | Hernandez et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0122960 A1 | 5/2007 | Aoki |
| 2007/0132591 A1 | 6/2007 | Khatri |
| 2007/0164414 A1 | 7/2007 | Dokai et al. |
| 2007/0200705 A1 | 8/2007 | Yamagajo et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0252763 A1 | 11/2007 | Martin |
| 2007/0252770 A1 | 11/2007 | Kai et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0068132 A1 | 3/2008 | Kayanakis et al. |
| 2008/0070003 A1 | 3/2008 | Nakatani et al. |
| 2008/0074268 A1 | 3/2008 | Shafer |
| 2008/0087990 A1 | 4/2008 | Kato et al. |
| 2008/0111695 A1 | 5/2008 | Yamagajo et al. |
| 2008/0129606 A1 | 6/2008 | Yanagisawa et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0252551 A1 | 10/2008 | Kubo et al. |
| 2008/0272885 A1 | 11/2008 | Atherton |
| 2009/0002130 A1 | 1/2009 | Kato |
| 2009/0008460 A1 | 1/2009 | Kato |
| 2009/0009007 A1 | 1/2009 | Kato et al. |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0066466 A1 | 3/2009 | Arimura |
| 2009/0080296 A1 | 3/2009 | Dokai et al. |
| 2009/0096696 A1 | 4/2009 | Joyce, Jr. et al. |

(56) References Cited

U.S. PATENT DOCUMENTS

| | | |
|---|---|---|
| 2009/0109034 A1 | 4/2009 | Chen et al. |
| 2009/0109102 A1 | 4/2009 | Dokai et al. |
| 2009/0121949 A1* | 5/2009 | Washiro ............... 343/702 |
| 2009/0134979 A1 | 5/2009 | Tsukamoto et al. |
| 2009/0140947 A1 | 6/2009 | Sasagawa et al. |
| 2009/0160719 A1 | 6/2009 | Kato et al. |
| 2009/0201116 A1* | 8/2009 | Orihara ............... 336/200 |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0284220 A1 | 11/2009 | Toncich et al. |
| 2009/0321527 A1 | 12/2009 | Kato et al. |
| 2010/0103058 A1 | 4/2010 | Kato et al. |
| 2010/0182210 A1 | 7/2010 | Ryou et al. |
| 2010/0283694 A1 | 11/2010 | Kato |
| 2010/0308118 A1 | 12/2010 | Kataya et al. |
| 2011/0031320 A1 | 2/2011 | Kato et al. |
| 2011/0063184 A1* | 3/2011 | Furumura et al. ........... 343/856 |
| 2011/0080331 A1 | 4/2011 | Kato |
| 2011/0186641 A1 | 8/2011 | Kato et al. |
| 2011/0253795 A1 | 10/2011 | Kato |
| 2012/0001701 A1 | 1/2012 | Taniguchi et al. |
| 2012/0112971 A1* | 5/2012 | Takeyama ............... H01Q 7/04 343/702 |
| 2012/0176282 A1 | 7/2012 | Kato et al. |
| 2012/0299786 A1* | 11/2012 | Anguera ............... H01Q 1/48 343/702 |
| 2012/0306714 A1* | 12/2012 | Yosui et al. ........... 343/788 |

FOREIGN PATENT DOCUMENTS

| | | | |
|---|---|---|---|
| DE | 10 2006 057 369 A1 | 6/2008 | |
| EP | 0 694 874 A2 | 1/1996 | |
| EP | 0 848 448 A2 | 6/1998 | |
| EP | 0 948 083 A2 | 10/1999 | |
| EP | 0 977 145 A2 | 2/2000 | |
| EP | 1 010 543 A1 | 6/2000 | |
| EP | 1 085 480 A1 | 3/2001 | |
| EP | 1 160 915 A2 | 12/2001 | |
| EP | 1 170 795 A2 | 1/2002 | |
| EP | 1 193 793 A2 | 4/2002 | |
| EP | 1 227 540 A1 | 7/2002 | |
| EP | 1 280 232 A1 | 1/2003 | |
| EP | 1 280 350 A1 | 1/2003 | |
| EP | 1 343 223 A1 | 9/2003 | |
| EP | 1 357 511 A2 | 10/2003 | |
| EP | 1 547 753 A1 | 6/2005 | |
| EP | 1 548 872 A1 | 6/2005 | |
| EP | 1 626 364 A2 | 2/2006 | |
| EP | 1 701 296 A1 | 9/2006 | |
| EP | 1 703 589 A1 | 9/2006 | |
| EP | 1 742 296 A1 | 1/2007 | |
| EP | 1 744 398 A1 | 1/2007 | |
| EP | 1 840 802 A1 | 10/2007 | |
| EP | 1 841 005 A1 | 10/2007 | |
| EP | 1 865 574 A1 | 12/2007 | |
| EP | 1 887 652 A1 | 2/2008 | |
| EP | 1 976 056 A1 | 10/2008 | |
| EP | 1 988 491 A1 | 11/2008 | |
| EP | 1 988 601 A1 | 11/2008 | |
| EP | 1 993 170 A1 | 11/2008 | |
| EP | 2 009 738 A1 | 12/2008 | |
| EP | 2 012 258 A1 | 1/2009 | |
| EP | 2 096 709 A1 | 9/2009 | |
| EP | 2 148 449 A1 | 1/2010 | |
| EP | 2 166 617 A1 | 3/2010 | |
| EP | 2 251 934 A1 | 11/2010 | |
| EP | 2 256 861 A1 | 12/2010 | |
| EP | 2 330 684 A1 | 6/2011 | |
| GB | 2 305 075 A | 3/1997 | |
| GB | 2461443 A | 1/2010 | |
| GB | 2470299 A | 11/2010 | |
| GB | 2487491 A | 7/2012 | |
| JP | 50-143451 A | 11/1975 | |
| JP | 61-284102 A | 12/1986 | |
| JP | 62-127140 U | 8/1987 | |
| JP | 01-212035 A | 8/1989 | |
| JP | 02-164105 A | 6/1990 | |
| JP | 02-256208 A | 10/1990 | |
| JP | 3-171385 A | 7/1991 | |
| JP | 03-503467 A | 8/1991 | |
| JP | 03-262313 A | 11/1991 | |
| JP | 04-150011 A | 5/1992 | |
| JP | 04-167500 A | 6/1992 | |
| JP | 04-096814 U | 8/1992 | |
| JP | 04-101168 U | 9/1992 | |
| JP | 04-134807 U | 12/1992 | |
| JP | 05-226926 A | 9/1993 | |
| JP | 05-327331 A | 12/1993 | |
| JP | 6-53733 | 2/1994 | |
| JP | 06-077729 A | 3/1994 | |
| JP | 06-029215 U | 4/1994 | |
| JP | 06-177635 A | 6/1994 | |
| JP | 6-260949 A | 9/1994 | |
| JP | 07-183836 A | 7/1995 | |
| JP | 08-055725 A | 2/1996 | |
| JP | 08-056113 A | 2/1996 | |
| JP | 8-87580 A | 4/1996 | |
| JP | 08-88586 A | 4/1996 | |
| JP | 08-088586 A | 4/1996 | |
| JP | 08-176421 A | 7/1996 | |
| JP | 08-180160 A | 7/1996 | |
| JP | 08-279027 A | 10/1996 | |
| JP | 08-307126 A | 11/1996 | |
| JP | 08-330372 A | 12/1996 | |
| JP | 09-014150 A | 1/1997 | |
| JP | 09-035025 A | 2/1997 | |
| JP | 09-093029 A | 4/1997 | |
| JP | 9-93029 A | 4/1997 | |
| JP | 09-245381 A | 9/1997 | |
| JP | 09-252217 A | 9/1997 | |
| JP | 09-270623 A | 10/1997 | |
| JP | 09-284038 A | 10/1997 | |
| JP | 09-294374 A | 11/1997 | |
| JP | 9-512367 A | 12/1997 | |
| JP | 10-069533 A | 3/1998 | |
| JP | 10-69533 A | 3/1998 | |
| JP | 10-084406 A | 3/1998 | |
| JP | 10-505466 A | 5/1998 | |
| JP | 10-171954 A | 6/1998 | |
| JP | 10-173427 A | 6/1998 | |
| JP | 10-193849 A | 7/1998 | |
| JP | 10-193851 A | 7/1998 | |
| JP | 10-242742 A | 9/1998 | |
| JP | 10-293828 A | 11/1998 | |
| JP | 10-334203 A | 12/1998 | |
| JP | 2834584 B2 | 12/1998 | |
| JP | 11-025244 A | 1/1999 | |
| JP | 11-039441 A | 2/1999 | |
| JP | 11-075329 A | 3/1999 | |
| JP | 11-085937 A | 3/1999 | |
| JP | 11-88241 A | 3/1999 | |
| JP | 11-102424 A | 4/1999 | |
| JP | 11-103209 A | 4/1999 | |
| JP | 11-149536 A | 6/1999 | |
| JP | 11-149537 A | 6/1999 | |
| JP | 11-149538 A | 6/1999 | |
| JP | 11-175678 A | 7/1999 | |
| JP | 11-219420 A | 8/1999 | |
| JP | 11-220319 A | 8/1999 | |
| JP | 11-282993 A | 10/1999 | |
| JP | 11-328352 A | 11/1999 | |
| JP | 11-331014 A | 11/1999 | |
| JP | 11-346114 A | 12/1999 | |
| JP | 11-515094 A | 12/1999 | |
| JP | 2000-21128 A | 1/2000 | |
| JP | 2000-021639 A | 1/2000 | |
| JP | 2000-022421 A | 1/2000 | |
| JP | 2000-048152 A | 2/2000 | |
| JP | 2000-059260 A | 2/2000 | |
| JP | 2000-085283 A | 3/2000 | |

(56) References Cited

FOREIGN PATENT DOCUMENTS

| | | |
|---|---|---|
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-76750 A | 3/2002 |
| JP | 2002-076750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-245416 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-290130 A | 10/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-324221 A | 11/2002 |
| JP | 2002-325013 A | 11/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-108966 A | 4/2003 |
| JP | 2003-110344 A | 4/2003 |
| JP | 2003-132330 A | 5/2003 |
| JP | 2003-134007 A | 5/2003 |
| JP | 2003-139866 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-506905 A | 3/2004 |
| JP | 2004-104344 A | 4/2004 |
| JP | 2004-121412 A | 4/2004 |
| JP | 2004-126750 A | 4/2004 |
| JP | 2004-127230 A | 4/2004 |

(56) References Cited

FOREIGN PATENT DOCUMENTS

| | | |
|---|---|---|
| JP | 2004-140513 A | 5/2004 |
| JP | 2004-145449 A | 5/2004 |
| JP | 2004-163134 A | 6/2004 |
| JP | 2004-166175 A | 6/2004 |
| JP | 2004-166176 A | 6/2004 |
| JP | 2004-172919 A | 6/2004 |
| JP | 2004-213582 A | 7/2004 |
| JP | 2004-519916 A | 7/2004 |
| JP | 2004/070879 A | 8/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-336604 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-006096 A | 1/2005 |
| JP | 2005-18156 A | 1/2005 |
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-202943 A | 7/2005 |
| JP | 2005-204038 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-328259 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-013120 A | 1/2007 |
| JP | 2007-13120 A | 1/2007 |
| JP | 2007-18067 A | 1/2007 |
| JP | 2007-019905 A | 1/2007 |
| JP | 2007-028002 A | 2/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-068073 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-194924 A | 8/2007 |
| JP | 2007-524942 A | 8/2007 |
| JP | 2007-228254 A | 9/2007 |
| JP | 2007-228325 A | 9/2007 |
| JP | 2007-228437 A | 9/2007 |
| JP | 2007-233597 A | 9/2007 |
| JP | 2007-241789 A | 9/2007 |
| JP | 2007-249620 A | 9/2007 |

(56) References Cited

FOREIGN PATENT DOCUMENTS

| | | |
|---|---|---|
| JP | 2007-266999 A | 10/2007 |
| JP | 2007-272264 A | 10/2007 |
| JP | 2007-279782 A | 10/2007 |
| JP | 2007-287128 A | 11/2007 |
| JP | 2007-295177 A | 11/2007 |
| JP | 2007-295395 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042379 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-118359 A | 5/2008 |
| JP | 2008-513888 A | 5/2008 |
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-182438 A | 8/2008 |
| JP | 2008-197714 A | 8/2008 |
| JP | 2008-535372 A | 8/2008 |
| JP | 2008-207875 A | 9/2008 |
| JP | 2008-211572 A | 9/2008 |
| JP | 2008-217406 A | 9/2008 |
| JP | 2008-226099 A | 9/2008 |
| JP | 2008-244739 A | 10/2008 |
| JP | 2008-252517 A | 10/2008 |
| JP | 2008-288915 A | 11/2008 |
| JP | 2008-294491 A | 12/2008 |
| JP | 2009-017284 A | 1/2009 |
| JP | 2009-021970 A | 1/2009 |
| JP | 2009-25870 A | 2/2009 |
| JP | 2009-027291 A | 2/2009 |
| JP | 2009-27291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |
| JP | 2009-110144 A | 5/2009 |
| JP | 2009-111950 A | 5/2009 |
| JP | 2009-111986 A | 5/2009 |
| JP | 2009-130896 A | 6/2009 |
| JP | 2009-135166 A | 6/2009 |
| JP | 2009-524363 A | 6/2009 |
| JP | 2009-153166 A | 7/2009 |
| JP | 4301346 B2 | 7/2009 |
| JP | 2009-181246 A | 8/2009 |
| JP | 2009-182630 A | 8/2009 |
| JP | 2009-213169 A | 9/2009 |
| JP | 2009-213171 A | 9/2009 |
| JP | 2009-260758 A | 11/2009 |
| JP | 2009-278441 A | 11/2009 |
| JP | 2009-284182 A | 12/2009 |
| JP | 2010-009196 A | 1/2010 |
| JP | 2010-015342 A | 1/2010 |
| JP | 2010-504598 A | 2/2010 |
| JP | 2010-050844 A | 3/2010 |
| JP | 2010-051012 A | 3/2010 |
| JP | 2010-051017 A | 3/2010 |
| JP | 2010-074839 A | 4/2010 |
| JP | 2010-081571 | 4/2010 |
| JP | 2010-102445 A | 5/2010 |
| JP | 2010-171857 A | 8/2010 |
| JP | 4535209 B2 | 9/2010 |
| JP | 4561932 B2 | 10/2010 |
| JP | 2010-268306 A | 11/2010 |
| JP | 2010-279029 A | 12/2010 |
| JP | 2011-015395 A | 1/2011 |
| JP | 4609604 B2 | 1/2011 |
| JP | 2011-076567 A | 4/2011 |
| JP | 2011-139533 A | 7/2011 |
| JP | 2011-142648 A | 7/2011 |
| JP | 2011-205384 A | 10/2011 |
| JP | 2012-033021 A | 2/2012 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/013168 A1 | 2/2007 |
| WO | 2007/060792 A1 | 5/2007 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/099602 A1 | 9/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/001561 A1 | 1/2008 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/005080 A1 | 1/2009 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 2010/026939 A1 | 3/2010 |
| WO | 2010/050361 A1 | 5/2010 |
| WO | 2010/079830 A1 | 7/2010 |
| WO | 2010/104179 A1 | 9/2010 |
| WO | 2010/119854 A1 | 10/2010 |
| WO | 2011/062274 A1 | 5/2011 |

OTHER PUBLICATIONS

Osamura et al.: "Packaging Material With Electromagnetic Coupling Module," U.S. Appl. No. 12/536,669, filed Aug. 6, 2009.
Dokai et al.: "System for Inspecting Electromagnetic Coupling Modules and Radio IC Devices and Method for Manufacturing

(56) References Cited

OTHER PUBLICATIONS

Electromagnetic Coupling Modules and Radio IC Devices Using the System"; U.S. Appl. No. 12/274,400, filed Nov. 20, 2008.
Kato et al.: "Wireless IC Device and Component for Wireless IC Device"; U.S. Appl. No. 12/339,198, filed Dec. 19, 2008.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Device and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device", U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/543,553, filed Aug. 19, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.

(56) References Cited

OTHER PUBLICATIONS

Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.

Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.

(56) References Cited

OTHER PUBLICATIONS

Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official Communication issued in International Patent Application No. PCT/JP2012/072849, mailed on Nov. 20, 2012.
Kimura et al.: "Wireless Communication Device"; U.S. Appl. No. 14/082,435, filed Nov. 18, 2013.
Kato: "Antenna Device and Wireless Device"; U.S. Appl. No. 14/085,830, filed Nov. 21, 2013.
Kato et al.: "Wireless IC Device Component and Wireless IC Device"; U.S. Appl. No. 14/151,852, filed Jan. 10, 2014.
Kato: "Wireless IC Device and Electromagnetic Coupling Module"; U.S. Appl. No. 14/160,597, filed Jan. 22, 2014.
Kato et al.: "Wireless IC Device"; U.S. Appl. No. 14/162,806, filed Jan. 24, 2014.
Kato et al.: "Antenna Device and Wireless Communication Device"; U.S. Appl. No. 14/171,004, filed Feb. 3, 2014.
Kato et al.: "Antenna and Wireless IC Device"; U.S. Appl. No. 14/182,339, filed Feb. 18, 2014.
Kimura et al., "Wireless Communication Device", U.S. Appl. No. 14/187,364, filed Feb. 24, 2014.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless IC Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.
Official Communication issued in International Patent Application No. PCT/JP2011/068110, mailed on Sep. 20, 2011.
Dokai et al.: "Antenna and Wireless Communication Device"; U.S. Appl. No. 13/613,021, filed Sep. 13, 2012.
Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6, 2012.
Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Nakano et al.: "Communication Terminal Device"; U.S. Appl. No. 13/760,196, filed Feb. 6, 2013.
Official Communication issued in International Patent Application No. PCT/JP2011/073054, mailed on Dec. 20, 2011.
Official Communication issued in International Patent Application No. PCT/JP2011/073490, mailed on Jan. 10, 2012.
Kato et al.: "Antenna Device and Communication Terminal Apparatus"; U.S. Appl. No. 13/761,195, filed Feb. 7, 2013.
Kato et al.: "Antenna Device and Mobile Communication Terminal"; U.S. Appl. No. 13/767,960, filed Feb. 15, 2013.
Official Communication issued in International Patent Application No. PCT/JP2012/058884, mailed on Jun. 12, 2012.
Dokai et al.: "Wireless Communication Device"; U.S. Appl. No. 13/782,346, filed Mar. 1, 2013.
Official Communication issued in International Patent Application No. PCT/JP2012/053344, mailed on May 22, 2012.
Official Communication issued in International Patent Application No. PCT/JP2012/050557, mailed on Apr. 10, 2012.
Kimura et al.: "Wireless Communication Device"; U.S. Appl. No. 13/789,761, filed Mar. 8, 2013.

(56) References Cited

OTHER PUBLICATIONS

Dokai et al.: "RFID Chip Package and RFID Tag"; U.S. Appl. No. 13/792,650, filed Mar. 11, 2013.
Kato et al.: "Wireless IC Device Component and Wireless IC Device"; U.S. Appl. No. 13/794,929, filed Mar. 12, 2013.
Kato et al.: "Wireless IC Device and Component for Wireless IC Device"; U.S. Appl. No. 13/848,748, filed Mar. 22, 2013.
Official Communication issued in International Patent Application No. PCT/JP2012/080493, mailed on Dec. 25, 2012.
Mukai et al.: "Inspection Method and Inspection Device for RFID Tag"; U.S. Appl. No. 13/933,184, filed Jul. 2, 2013.
Kato et al.: "Antenna Device and Method of Setting Resonant Frequency of Antenna Device"; U.S. Appl. No. 13/941,760, filed Jul. 15, 2013.
Kato et al.: "Antenna Device and Method of Setting Resonant Frequency of Antenna Device"; U.S. Appl. No. 13/943,973, filed Jul. 17, 2013.
Official Communication issued in International Patent Application No. PCT/JP2012/080700, mailed on Jan. 15, 2013.
Mukai et al.: "Wireless Integrated Circuit Device and Method of Manufacturing the Same"; U.S. Appl. No. 13/961,995, filed Aug. 8, 2013.
Kato et al.: "Radio IC Device"; U.S. Appl. No. 13/964,234, filed Aug. 12, 2013.
Official Communication issued in International Patent Application No. PCT/JP2012/067779, mailed on Aug. 28, 2012.
Official Communication issued in International Patent Application No. PCT/JP2013/051254, mailed on Apr. 2, 2013.
Dokai: "Wireless Communication Device"; U.S. Appl. No. 13/970,633, filed Aug. 20, 2013.
Official Communication issued in International Patent Application No. PCT/JP2012/059350, mailed on Jul. 3, 2012.
Dokai: "Wireless IC Device"; U.S. Appl. No. 14/011,823, filed Aug. 28, 2013.
Official Communication issued in International Patent Application No. PCT/JP2012/055505, mailed on Jun. 5, 2012.
Kato: "Radio IC Device and Radio Communication Terminal"; U.S. Appl. No. 14/017,406, filed Sep. 4, 2013.
Official Communication issued in International Patent Application No. PCT/JP2012/067454, mailed on Aug. 7, 2012.
Kato: "Antenna Device and Communication Terminal Apparatus"; U.S. Appl. No. 14/019,573, filed Sep. 6, 2013.
Official Communication issued in International Patent Application No. PCT/JP2012/067537, mailed on Oct. 9, 2012.
Kato: "Radio Communication Device"; U.S. Appl. No. 14/027,384, filed Sep. 16, 2013.
Kato: "Antenna Device, RFID Tag, and Communication Terminal Apparatus"; U.S. Appl. No. 14/031,270, filed Sep. 19, 2013.
Kato et al.: "Wireless IC Device"; U.S. Appl. No. 14/054,865, filed Oct. 16, 2013.
Official Communication issued in International Patent Application No. PCT/JP2012/062259, mailed on Jun. 12, 2012.
Dokai et al.: "Radio IC Device"; U.S. Appl. No. 14/078,596, filed Nov. 13, 2013.
Official Communication issued in corresponding Great Britain Patent Application No. 1221947.3, mailed on Oct. 28, 2016.

\* cited by examiner

FIG. 4
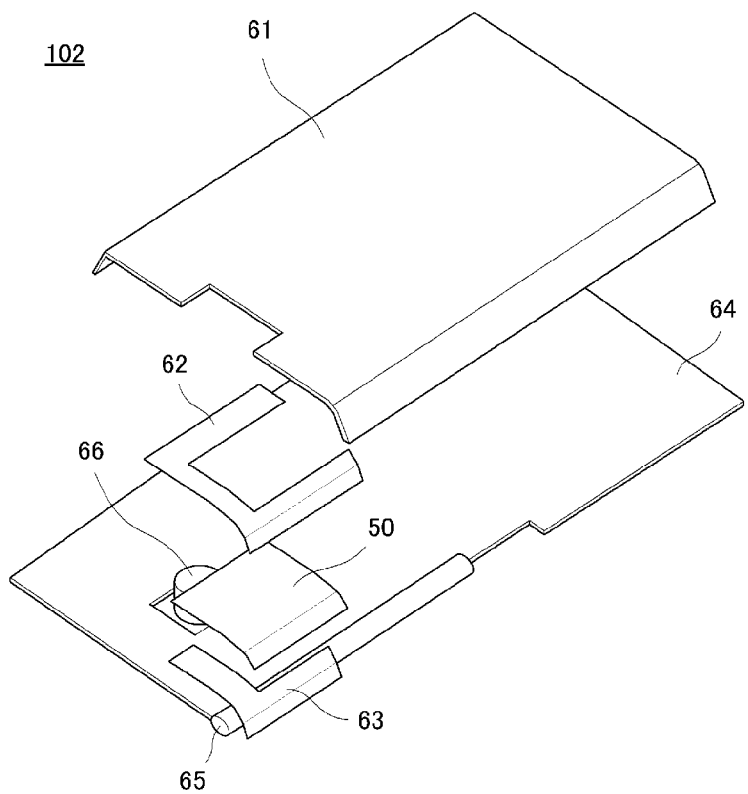
FIG. 5
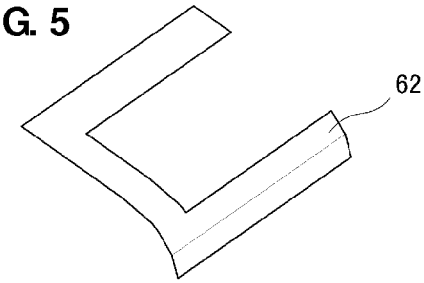
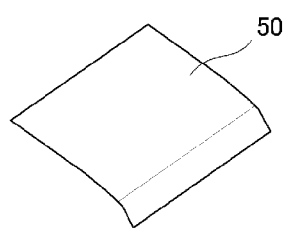
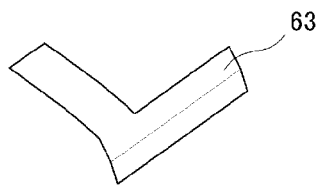

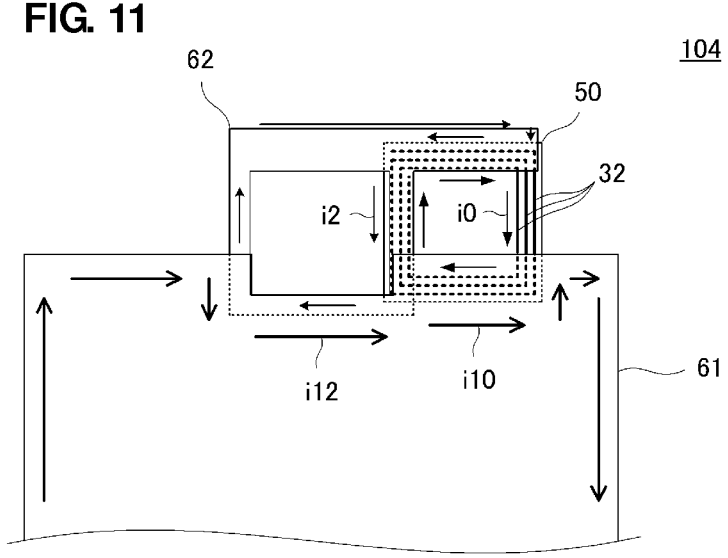

ANTENNA APPARATUS AND COMMUNICATION TERMINAL INSTRUMENT

BACKGROUND OF THE INVENTION

1. Field of the Invention

The present invention relates to antenna apparatuses and communication terminal instruments for use in RFID systems or near field wireless communication systems, which communicate with counterpart devices through electromagnetic signals.

2. Description of the Related Art

In an RFID system or a near field wireless communication system, the use of which is growing in recent years, a communication antenna is mounted on each device for communications between portable electronic instruments such as portable phones or between a portable electronic instrument and a reader/writer. Of these antennas, International Publication Pamphlet No. WO 2009/142114 discloses antennas to be mounted on portable electronic instruments.

FIG. 1A is a cross-sectional diagram of a principle portion of a wireless IC device described in International Publication Pamphlet No. WO 2009/142114. FIG. 1B is a diagram illustrating a spatial arrangement of a power feed circuit board and a radiation board of the wireless IC device. The wireless IC device 1 includes a wireless IC chip 5 that processes predetermined radio signals, a power feed circuit board 4 that is connected to the wireless IC chip 5 and includes a power feed circuit including at least one coil pattern 23, and a radiation plate 3 that radiates transmission signals provided from the power feed circuit board 4, receives reception signals, and provides them to the power feed circuit board 4. The radiation plate 3 includes in part an opening portion 7 and a slit portion 6 connecting to the opening portion 7. The opening portion 7 of the radiation plate 3 overlaps an inner side region of the coil pattern 23 in plan view when viewed in a winding axis direction of the coil pattern 23, and areas of the inner side region and the opening portion 7 are nearly equal to each other.

In FIG. 1A, when a radio signal is being transmitted, a signal current flows from the wireless IC chip 5 to the coil pattern 23. An induced magnetic field H generated by that current distributes through the opening portion 7 as illustrated by dotted lines in the drawing. The induced magnetic field H causes induced currents I1 and I2 to flow in a surrounding portion of the opening portion 7, as illustrated in FIG. 1B. Here, the slit portion 6 is connected to the opening portion 7. Thus, the slit portion 6 limits the flows of these induced currents I1 and I2. As described above, in the radiation plate 3, the induced currents I1 and I2 are induced by the magnetic field H. This magnetic field causes the radio signal to be transmitted.

However, it is necessary to have the opening portion and the slit portion in the radiation plate. Thus, a restriction is imposed on the shape of the radiation plate, and a highly accurate positional relationship between the radiation plate and the coil conductor must be satisfied.

SUMMARY OF THE INVENTION

Accordingly, preferred embodiments of the present invention provide an antenna apparatus and a communication terminal instrument in which a shape of a radiation plate may be more freely determined without requiring a highly accurate positional relationship between the radiation plate and a coil conductor.

An antenna apparatus according to a preferred embodiment of the present invention includes a power feed antenna that includes a coil conductor, to which a power feed circuit is connected; a first booster conductor that couples to the coil conductor of the power feed antenna through an electromagnetic field; and a second booster conductor that couples to the first booster conductor through an electromagnetic field and couples to the power feed antenna through an electromagnetic field.

For example, in plan view, a first edge portion of the coil conductor overlaps a first edge portion of the first booster conductor, a second edge portion of the coil conductor overlaps a first edge portion of the second booster conductor, and a second edge portion of the first booster conductor overlaps a second edge portion of the second booster conductor.

According to the foregoing structure, a current is induced in the first booster conductor by the power feed antenna, and a current is induced in the second booster conductor by the first booster conductor and the power feed antenna. Thus, according to the foregoing structure, neither an opening portion nor a slit is necessary. Thus, the provision of the first booster conductor and the second booster conductor makes it possible to more freely determine a shape of a radiation plate (first and second booster conductors).

When the first booster conductor is larger than the second booster conductor, a degree of freedom in arranging the two booster conductors becomes higher and fitting into an electronic device becomes easier, compared to a case where the first booster conductor and the second booster conductor have the same size.

Furthermore, when a distance between the power feed antenna and the first booster conductor is shorter than a distance between the power feed antenna and the second booster conductor, the first booster conductor, which is the larger booster conductor, couples to the power feed antenna more strongly. Accordingly, a better antenna characteristic may be obtained, compared to a case where the second booster conductor, which is the smaller booster conductor, couples to the power feed antenna more strongly.

A communication terminal instrument according to a preferred embodiment of the present invention includes an antenna apparatus including a power feed antenna that includes a coil conductor; a first booster conductor that couples to the coil conductor of the power feed antenna through an electromagnetic field; and a second booster conductor that couples to the first booster conductor through an electromagnetic field and couples to the power feed antenna through an electromagnetic field. The communication terminal instrument further includes a power feed circuit that is connected to the coil conductor.

The first booster conductor preferably is, for example, a metal member contained inside a casing or is the case of the communication terminal instrument. According to the foregoing structure, no special member is required to define the first booster conductor. Thus, the number of components, a device size, and manufacturing costs are significantly reduced.

According to various preferred embodiments of the present invention, no radiation plate having an opening portion and a slit is necessary. Thus, the provision of the first booster conductor and the second booster conductor makes it possible to determine the shape of the radiation plate (first and second booster conductors) more freely. Furthermore, a highly accurate positional relationship among the first and second booster conductors, which define the radiation plate, and the coil conductor is not required.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is an exploded perspective view of an antenna apparatus 102 according to a second preferred embodiment of the present invention.

FIG. 5 is an exploded perspective view illustrating shapes of a second booster conductor 62, a power feed antenna 50, and a ferrite sheet 63, and a positional relationship among them.

FIG. 11 is a diagram illustrating an operational principle of the antenna apparatus 104, and illustrates ways of coupling among a power feed antenna 50, a first booster conductor 61, and a second booster conductor 62.

DETAILED DESCRIPTION OF THE PREFERRED EMBODIMENTS

First Preferred Embodiment

Figure 1A:
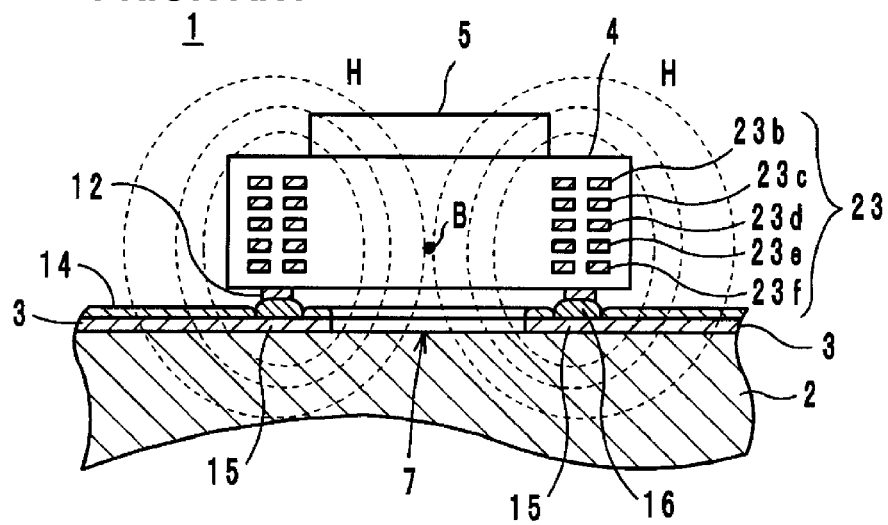
FIG. 1A is a cross-sectional diagram of a principle portion of a wireless IC device described in International Publication Pamphlet No. WO 2009/142114.
Figure 1B:
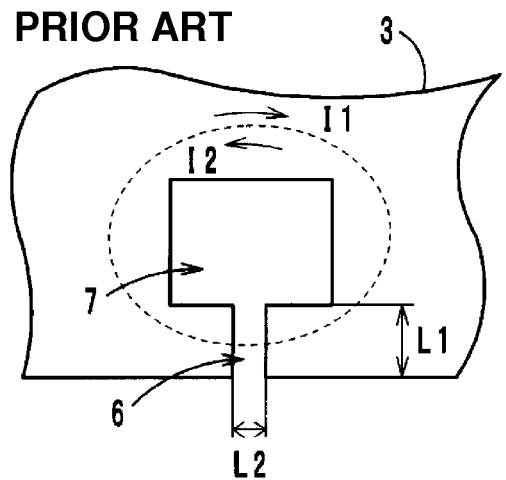
FIG. 1B is a diagram illustrating a spatial arrangement of a power feed circuit board and a radiation board of the wireless IC device.
Figure 2A:
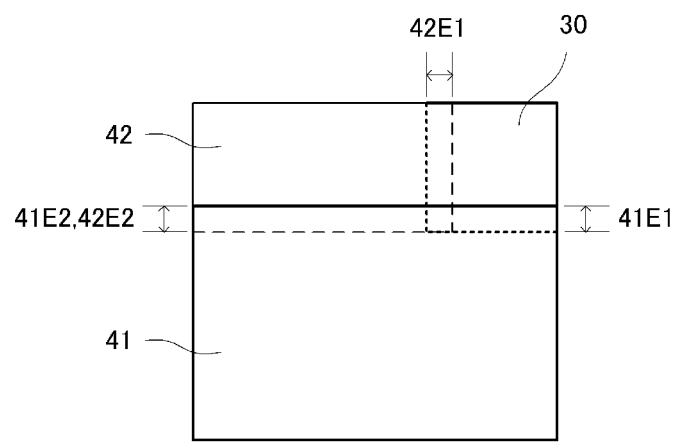
FIG. 2A is a schematic plan view of an antenna apparatus 101 according to a first preferred embodiment of the present invention.
Figure 2B:
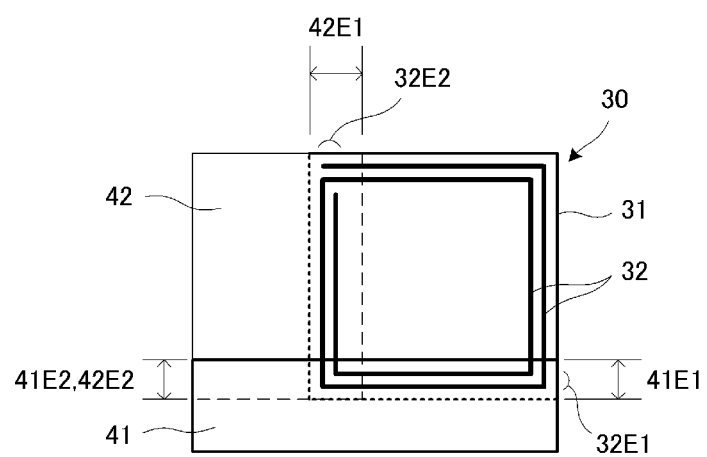
FIG. 2B is a partially enlarged plan view of the antenna apparatus 101.

An antenna apparatus according to a first preferred embodiment is described with reference to FIGS. 2A, 2B and FIGS. 3A-3D. FIG. 2A is a schematic plan view of an antenna apparatus 101 according to the first preferred embodiment, and FIG. 2B is a partially enlarged plan view of the antenna apparatus 101.

The antenna apparatus 101 includes a power feed antenna 30, a first booster conductor 41, and a second booster conductor 42. As illustrated in FIG. 2B, the power feed antenna 30 preferably includes a spiral coil conductor 32 located on an insulating support film 31 such as a polyimide film.

The first booster conductor 41 preferably includes a conducting film located on an insulating support film such as a polyimide film. Similarly, the second booster conductor 42 preferably includes a conducting film located on an insulating support film such as a polyimide film.

A first edge portion 32E1 of the coil conductor 32 overlaps a first edge portion 41E1 of the first booster conductor 41. This arrangement allows the first booster conductor 41 to couple to the coil conductor 32 of the power feed antenna 30 through an electromagnetic field. Furthermore, a second edge portion 32E2 of the coil conductor 32 overlaps a first edge portion 42E1 of the second booster conductor 42. This arrangement allows the second booster conductor 42 to couple to the coil conductor 32 of the power feed antenna 30 through an electromagnetic field. Still furthermore, a second edge portion 41E2 of the first booster conductor 41 overlaps a second edge portion 42E2 of the second booster conductor 42. This arrangement allows the first booster conductor 41 to couple to the second booster conductor 42 through an electromagnetic field.

Figure 3B:
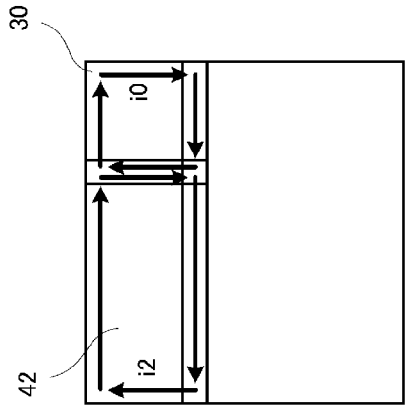
FIGS. 3A-3D are diagrams illustrating an operational principle of the antenna apparatus 101.
Figure 3D:
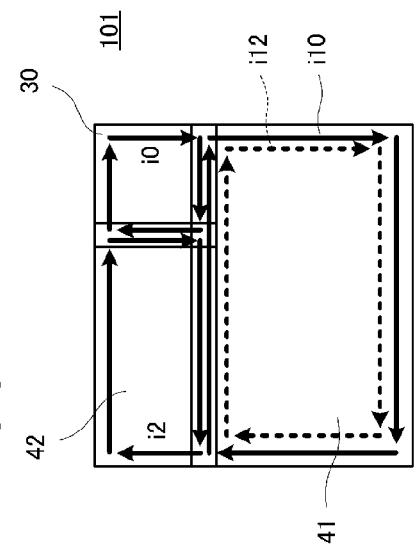
Figure 3A:
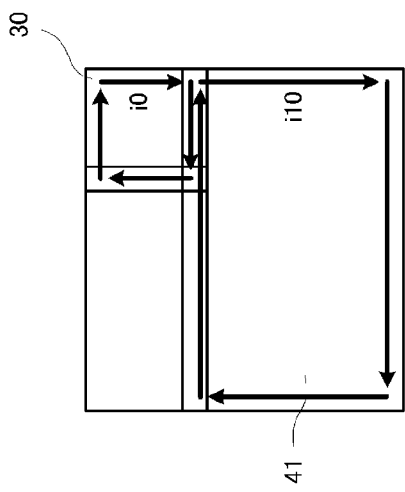

FIGS. 3A-3D are diagrams illustrating an operational principle of the antenna apparatus 101. FIG. 3A illustrates a way of coupling between the power feed antenna 30 and the first booster conductor 41.

As illustrated in FIG. 3A, a current i10 is induced in the first booster conductor 41 by a current i0 flowing through the coil conductor of the power feed antenna 30. That is, the current i0 causes the current i10 to flow through the first booster conductor 41 in a direction to cancel the current i0 at a portion where the power feed antenna 30 overlaps the first booster conductor 41. This current i10 circulates a circumference of the first booster conductor 41 due to an edge effect.

As illustrated in FIG. 3B, a current i2 is induced in the second booster conductor 42 by the current i0 flowing through the coil conductor of the power feed antenna 30. That is, the current i0 causes the current i2 to flow through the second booster conductor 42 in a direction to cancel the current i0 at a portion where the power feed antenna 30 overlaps the second booster conductor 42. This current i2 circulates a circumference of the second booster conductor 42 due to the edge effect.

Figure 3C:
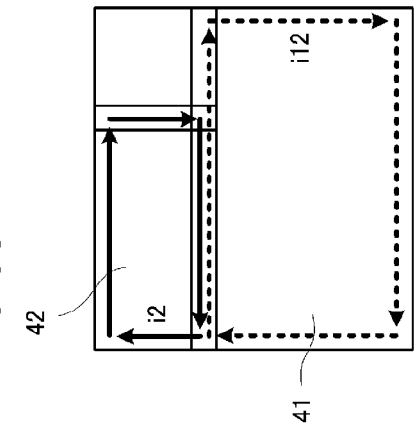

As illustrated in FIG. 3C, a current i12 is induced in the first booster conductor 41 by the current i2 flowing through the second booster conductor 42. That is, the current i2 causes the current i12 to flow through the first booster conductor 41 in a direction to cancel the current i2 at a portion where the second booster conductor 42 overlaps the first booster conductor 41. This current i12 circulates the circumference of the first booster conductor 41 due to the edge effect.

FIG. 3D illustrates the currents illustrated in FIGS. 3A-3C, which are superimposed on each other. Thus, the current i2 flows through the second booster conductor 42, and the currents i10 and i12 flow through the first booster conductor 41. The current i10 and the current i12 are currents in the same phase. Thus, both currents are added, and a current of i10+i12 flow through the first booster conductor 41. Accordingly, compared to a case where only the first booster conductor 41 is coupled to the power feed antenna 30, an additional current, the amount of which is equivalent to the current i2 and the current i12, flows. Furthermore, a current circulation path is expanded by having the current i2 flowing through the second booster conductor 42. These two effects improve an antenna gain.

It should be noted that there are a plurality of ways in the order of stacking the first booster conductor 41, the second booster conductor 42, and the power feed antenna 30. However, all the ways produce similar effects. When the first booster conductor 41 is larger than the second booster conductor 42, it is preferable, in view of improving an antenna characteristic, to have a shorter distance between the power feed antenna 30 and the first booster conductor 41 than a distance between the power feed antenna and the second booster conductor 42 because such an arrangement allows the first booster conductor 41, which is the larger booster conductor, to couple to the power feed antenna 30 more strongly.

In the example illustrated in FIG. 2, the coil conductor 32 defines a two-turn coil. The number of turns and the dimension of each side may be determined according to a required inductance. The coil conductor 32 and a circuit board are connected by, for example, pin terminals. That is, pad electrodes are preferably formed at both ends of the coil conductor 32 in advance, and configured so as to abut the pin terminals provided in a board on which the coil conductor 32 is mounted.

Second Preferred Embodiment

Figure 6:
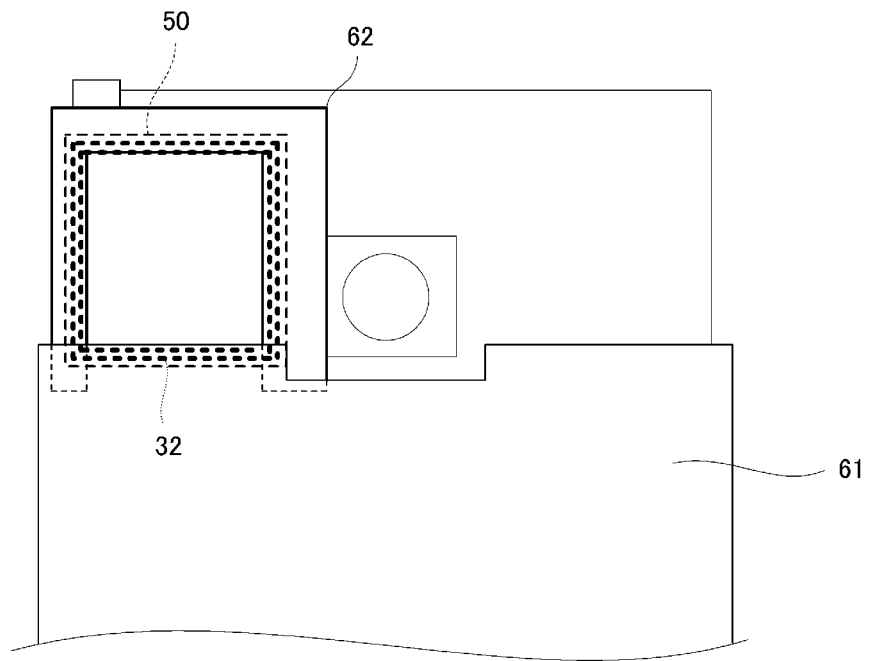
FIG. 6 is a partially enlarged plan view of the antenna apparatus 102.

An antenna apparatus and a communication terminal instrument according to a second preferred embodiment are described with reference to FIG. 4-FIG. 7. FIG. 4 is an exploded perspective view of an antenna apparatus 102 according to the second preferred embodiment. FIG. 5 is an exploded perspective view illustrating shapes of a second booster conductor 62, a power feed antenna 50 and a ferrite sheet 63, and a positional relationship among them. FIG. 6 is a partially enlarged plan view of the antenna apparatus 102. The antenna apparatus 102 is an antenna apparatus preferably for use typically in a near field wireless communication system or a RFID system using 13.56 MHz band (HF band), for example.

Figure 14:
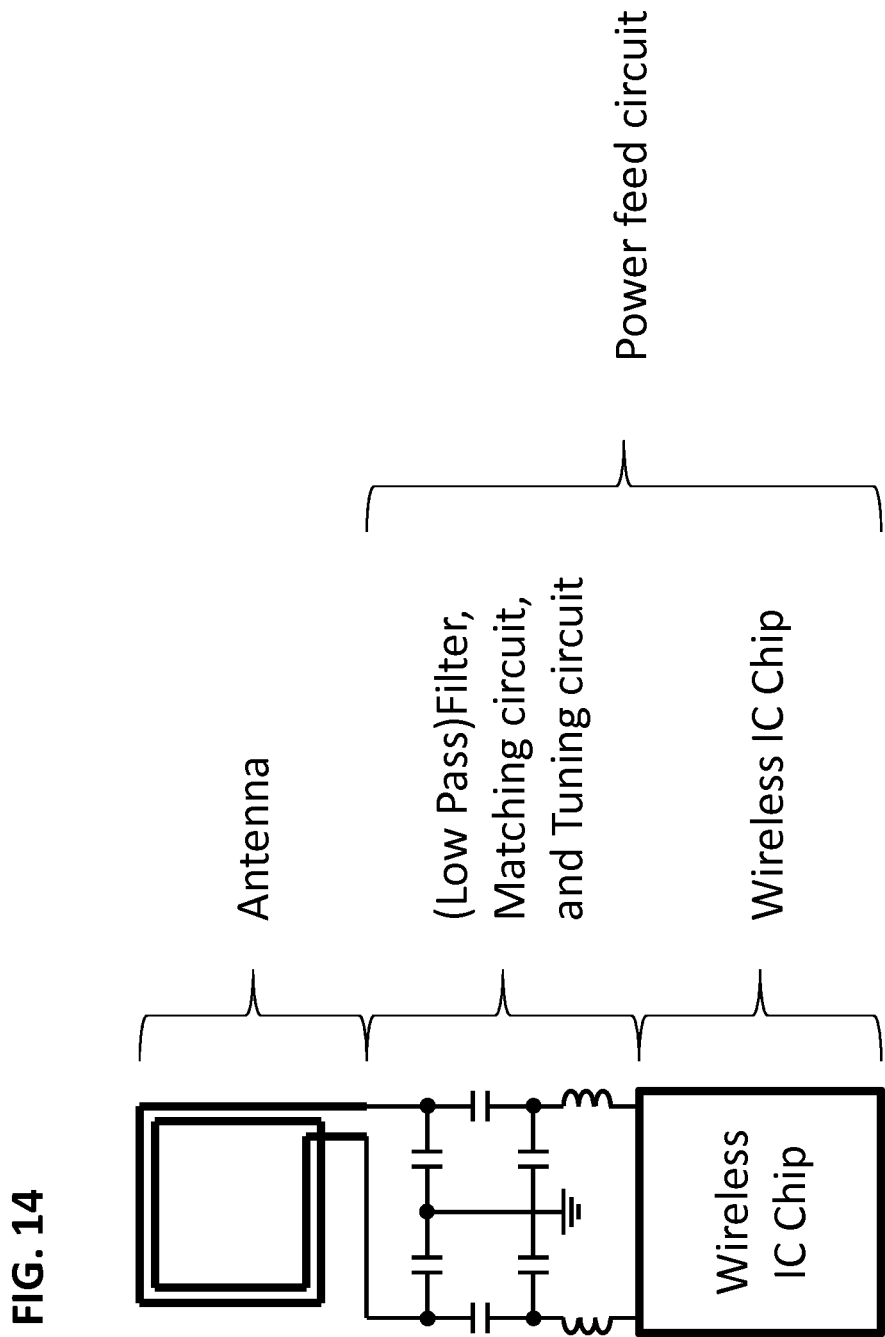
FIG. 14 is a schematic diagram illustrating a power feed circuit connected to a power feed antenna.

In FIG. 4, the antenna apparatus 102 preferably includes a power feed antenna 50, a first booster conductor 61, and a second booster conductor 62. Furthermore, the communication terminal instrument preferably includes the antenna apparatus 102, a printed wiring board 64, and components mounted on the printed wiring board 64. A rod antenna 65 and an image sensor 66 of a camera are mounted on the printed wiring board 64. Furthermore, a magnetic sheet 63, for example, such as a ferrite sheet, is arranged below the power feed antenna 50. Furthermore, the printed wiring board 64 is provided with a power feed circuit, for example, as shown in FIG. 14, that feeds power to a coil conductor 32 of the antenna apparatus 102. The first booster conductor 61 is a metal casing (thin metal sheet). That is, a member that is originally included in the communication terminal instrument is shared as the first booster conductor 61.

The power feed antenna 50 preferably includes a coil conductor located on an insulating support film, as is the case with the power feed antenna 30 illustrated in FIG. 2B in the first preferred embodiment. The second booster conductor 62 preferably has a shape similar to the letter "Π". The magnetic sheet 63 preferably has a shape similar to the letter "L", and overlaps the coil conductor 32 of the power feed antenna 50 on two sides thereof. The magnetic sheet 63 defines magnetic paths such that a magnetic flux, which extends beyond a winding center of the coil conductor of the power feed antenna 50, passes through edges of the printed wiring board.

In plan view, the first booster conductor 61 overlaps an edge portion of the coil conductor 32 of the power feed antenna 50, edge portions of the coil conductor 32 overlap edge portions of the second booster conductor 62, and an edge portion of the first booster conductor 61 overlaps edge portions of the second booster conductor 62. In this example, the second booster conductor 62 preferably has a shape similar to the letter "Π", and thus overlaps the coil conductor 32 on three sides. Furthermore, the first booster conductor 61 overlaps the coil conductor 32 on one side. That is, a loop is defined by the overlapping portion of the first booster conductor 61 and the overlapping portions of the second booster conductor 62, all of which overlap the coil conductor 32.

Figure 7:
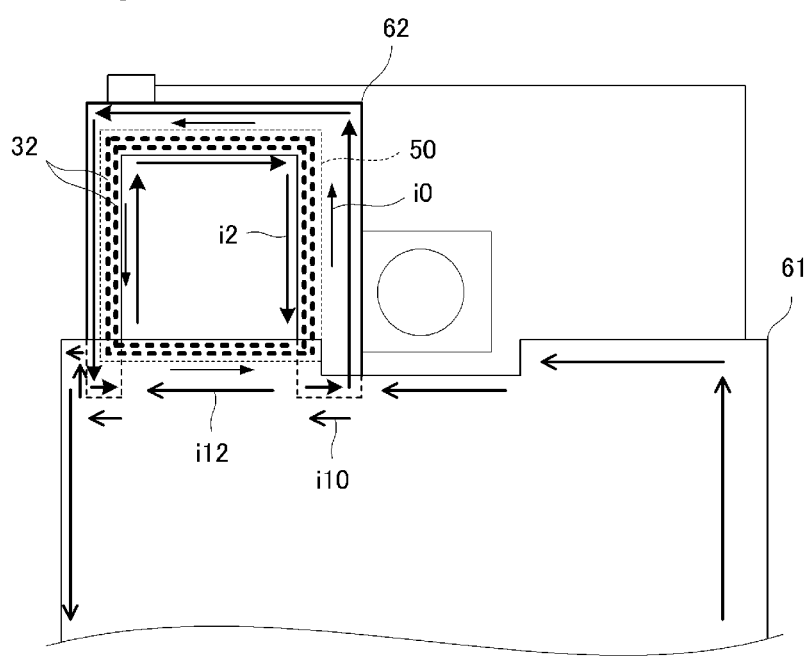
FIG. 7 is a diagram illustrating an operational principle of the antenna apparatus 102.

FIG. 7 is a diagram illustrating an operational principle of the antenna apparatus 102. FIG. 7 illustrates ways of coupling among the power feed antenna 50, the first booster conductor 61, and the second booster conductor 62.

First, a current i10 is induced in the first booster conductor 61 by a current i0 flowing through the coil conductor 32 of the power feed antenna 50. Furthermore, a current i2 is induced in the second booster conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

It should be noted that the magnetic sheet 63 illustrated in FIG. 5 may have the same shape as that of the power feed antenna 50 to cover the whole area of a bottom plane of the power feed antenna 50, for example. Furthermore, when there is no need for forced shaping of the magnetic path, no magnetic sheet is necessary. Furthermore, a magnetic member other than the ferrite may be used as the magnetic sheet.

A capacitor for frequency adjustment may be connected to both ends of the coil conductor 32 that is included in the power feed antenna 50 to determine a resonance frequency of the antenna apparatus 102. This capacitor for frequency adjustment may be provided at any one of the power feed antenna 50, the printed wiring board 64, and a wireless IC component.

Third Preferred Embodiment

Figure 8A:
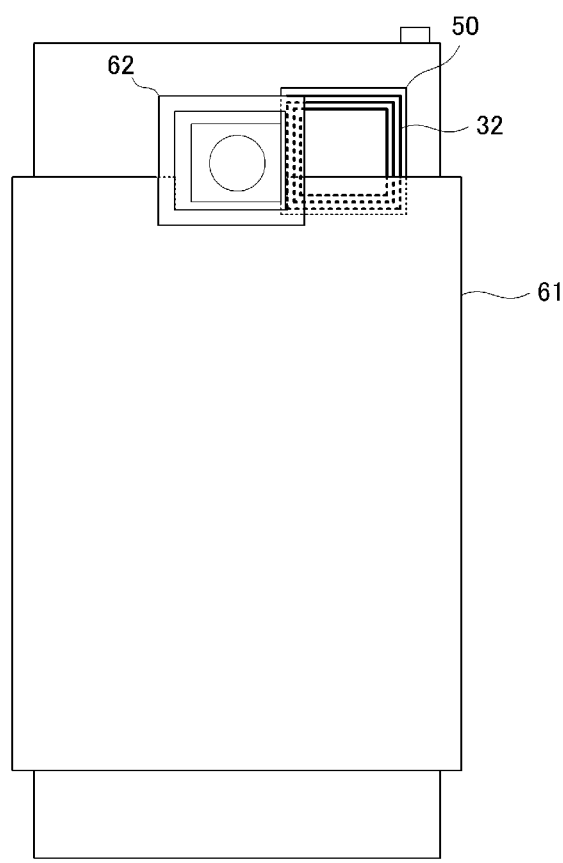
FIG. 8A is a plan view of an antenna apparatus 103.
Figure 8B:
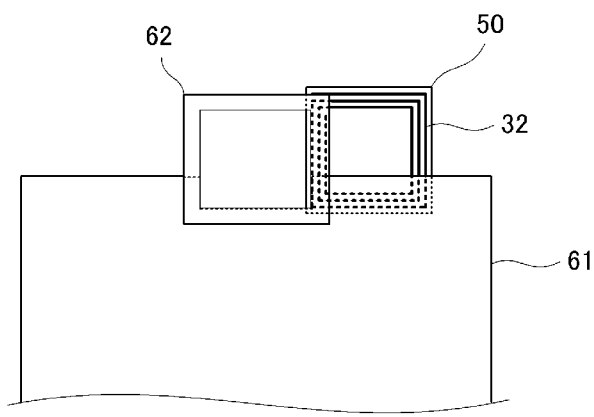
FIG. 8B is a plan view of a principle portion of the antenna apparatus 103.
Figure 9:
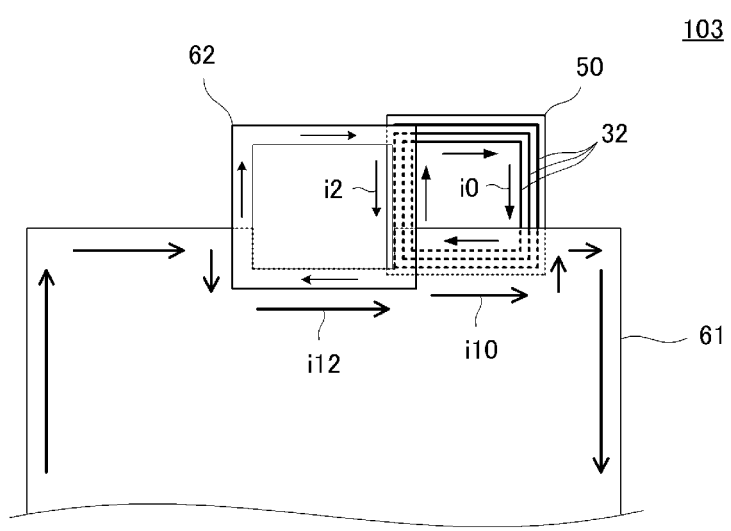
FIG. 9 is a diagram illustrating an operational principle of the antenna apparatus 103, and illustrates ways of coupling among a power feed antenna 50, a first booster conductor 61, and a second booster conductor 62.

An antenna apparatus according to a third preferred embodiment is described with reference to FIGS. 8A and 8B and FIG. 9. FIG. 8A is a plan view of an antenna apparatus 103, and FIG. 8B is a plan view of a principle portion of the antenna apparatus 103. FIG. 9 is a diagram illustrating an operational principle of the antenna apparatus 103, and illustrates ways of coupling among a power feed antenna 50, a first booster conductor 61, and a second booster conductor 62.

As illustrated in FIG. 8A, the antenna apparatus 103 preferably includes a coil conductor 32 of the power feed antenna, the first booster conductor 61, and the second booster conductor 62. The power feed antenna 50 preferably includes an insulating support film and the coil conductor 32 located on the support film. In the third preferred embodiment, the second booster conductor 62 preferably is ring-shaped, and one side thereof overlaps one side of the coil conductor 32. Furthermore, the power feed antenna 50, the first booster conductor 61, and the second booster conductor 62 are sequentially stacked in that order.

As illustrated in FIG. 9, first, a current i10 is induced in the first booster conductor 61 by a current i0 flowing through the coil conductor 32 of the power feed antenna 50. Furthermore, a current i2 is induced in the second booster conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

Fourth Preferred Embodiment

Figure 10A:
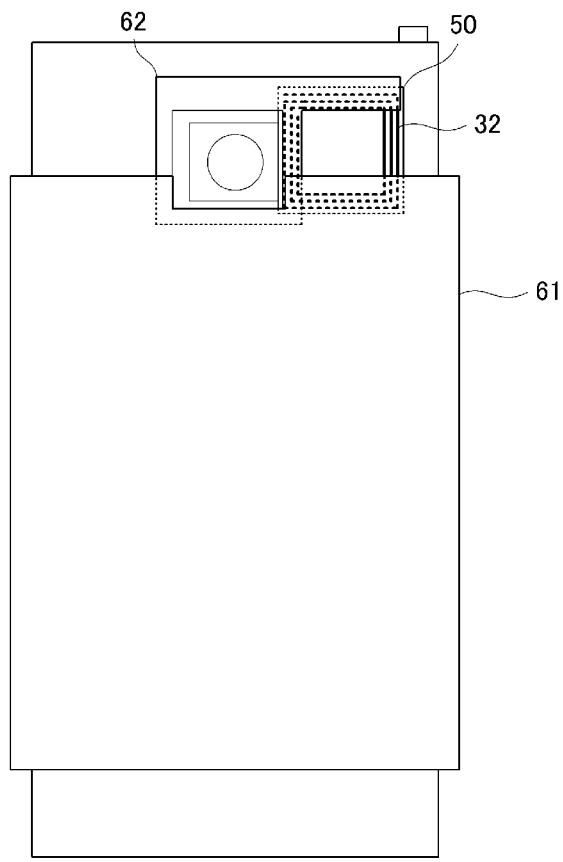
FIG. 10A is a plan view of an antenna apparatus 104.
Figure 10B:
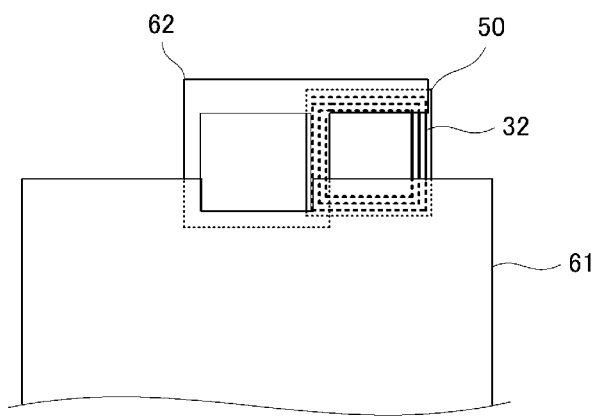
FIG. 10B is a plan view of a principle portion of the antenna apparatus 104.

An antenna apparatus according to a fourth preferred embodiment is described with reference to FIGS. 10A, 10B and FIG. 11. FIG. 10A is a plan view of an antenna apparatus 104, and FIG. 10B is a plan view of a principle portion of the antenna apparatus 104. FIG. 11 is a diagram illustrating an operational principle of the antenna apparatus 104, and illustrates ways of coupling among a power feed antenna 50, a first booster conductor 61, and a second booster conductor 62.

As illustrated in FIG. 10A, the antenna apparatus 104 preferably includes a coil conductor 32 of the power feed antenna, the first booster conductor 61, and the second booster conductor 62. The power feed antenna 50 preferably includes an insulating support film and the coil conductor 32 located on the support film. In the fourth preferred embodiment, the second booster conductor 62 has a ring portion and a portion linearly extending therefrom, and overlaps the coil conductor 32 on two sides thereof. Furthermore, the power feed antenna 50, the second booster conductor 62, and the first booster conductor 61 are sequentially stacked in that order.

As illustrated in FIG. 11, a current i10 is induced in the first booster conductor 61 by a current i0 flowing through the coil conductor 32 of the power feed antenna 50. Furthermore, a current i2 is induced in the second booster conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

Fifth Preferred Embodiment

Figure 12A:
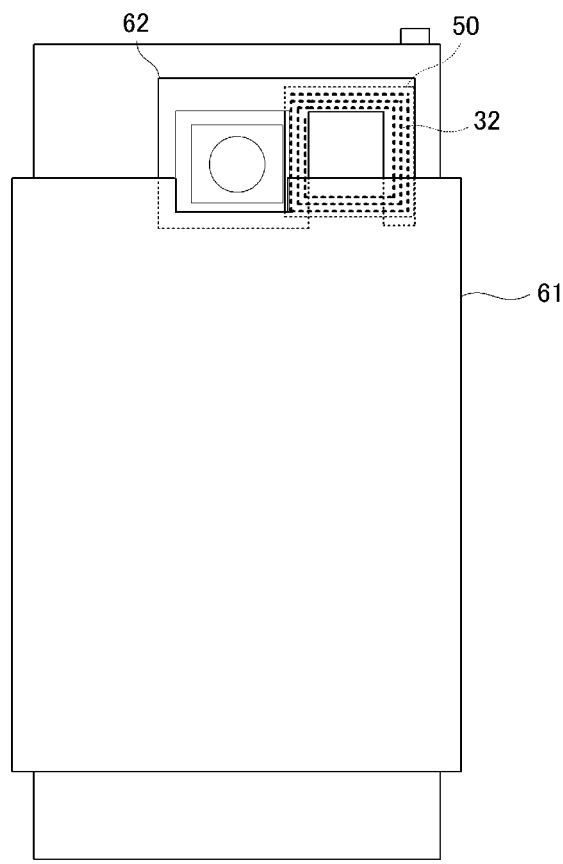
FIG. 12A is a plan view of an antenna apparatus 105.
Figure 12B:
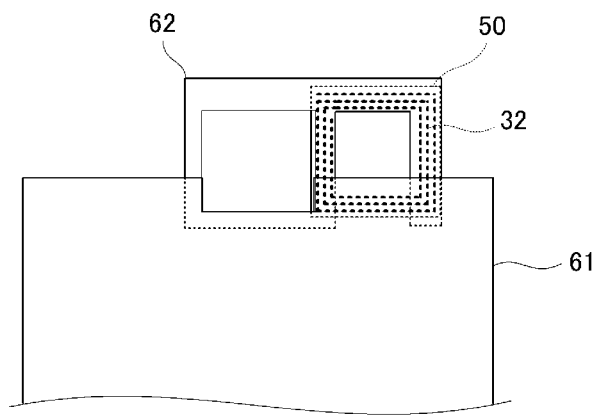
FIG. 12B is a plan view of a principle portion of the antenna apparatus 105.
Figure 13:
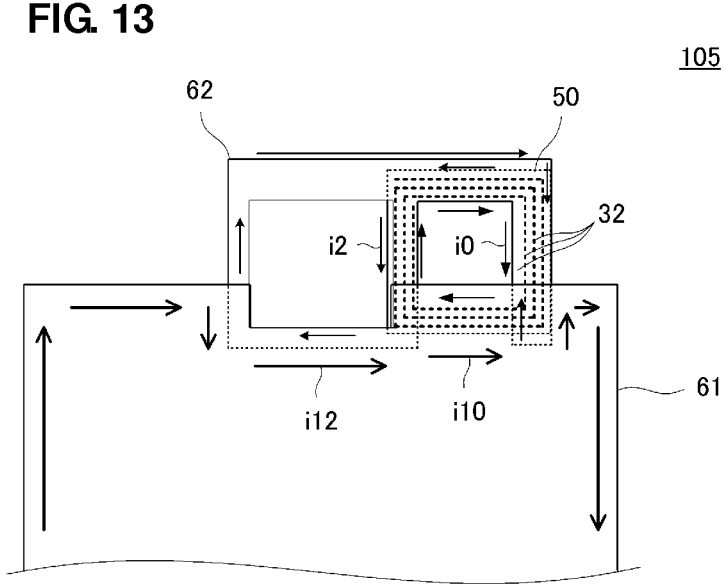
FIG. 13 is a diagram illustrating an operational principle of the antenna apparatus 105, and illustrates ways of coupling among a power feed antenna 50, a first booster conductor 61, and a second booster conductor 62.

An antenna apparatus according to a fifth preferred embodiment is described with reference to FIGS. 12A and 12B and FIG. 13. FIG. 12A is a plan view of an antenna apparatus 105, and FIG. 12B is a plan view of a principle portion of the antenna apparatus 105. FIG. 13 is a diagram illustrating an operational principle of the antenna apparatus 105, and illustrates ways of coupling among a power feed antenna 50, a first booster conductor 61, and a second booster conductor 62.

As illustrated in FIG. 12A, the antenna apparatus 105 preferably includes a coil conductor 32 of the power feed antenna, the first booster conductor 61, and the second booster conductor 62. The power feed antenna 50 preferably includes an insulating support film and the coil conductor 32 located on the support film, and includes an opening in a center portion. In the fifth preferred embodiment, the second booster conductor 62 includes a ring portion and a portion that has a shape similar to the letter "L" and extends from the ring portion, and overlaps the coil conductor 32 on three sides thereof. Furthermore, the power feed antenna 50, the second booster conductor 62, and the first booster conductor 61 are sequentially stacked in that order.

As illustrated in FIG. 13, first, a current i10 is induced in the first booster conductor 61 by a current i0 flowing through the coil conductor 32 of the power feed antenna 50. Furthermore, a current i2 is induced in the second conductor 62 by the current i0 flowing through the coil conductor 32 of the power feed antenna 50. Then, a current i12 is induced in the first booster conductor 61 by the current i2 flowing through the second booster conductor 62.

Accordingly, compared to a case where only the first booster conductor 61 is coupled to the power feed antenna 50, there exists an additional current flow, the amount of which is equivalent to the current i2 and the current i12. Furthermore, a current circulation path is expanded by having the current i2 flowing through the second booster conductor 62. These two effects improve an antenna gain.

Other Preferred Embodiments

In the foregoing preferred embodiments, the power feed coils include spiral conductor patterns. Alternatively, the power feed coils may include multilayered loop (helical) conductor patterns. The number of turns may be one if needed. Furthermore, planar shapes of the conductor patterns do not need to be rectangular, and may be circular or an irregular shape. Still furthermore, the number of the booster conductors may be three or more.

In the foregoing preferred embodiments, the examples are described for a case in which the power feed coil are preferably coupled to the first booster conductor and the second booster conductor through mostly a magnetic field. However, the coupling may be made through mostly an electric field depending on the frequency band. Furthermore, the coupling may alternatively be made through both an electric field and a magnetic field. This is because, when a high frequency signal is used, sufficient energy may be transferred even by capacitance generated between the power feed coil and the booster conductor. In the scope of claims and description of the present application, the "coupling through an electromagnetic field" includes three modes of coupling: "(1) coupling through mostly an electric field; (2) coupling through mostly a magnetic field; and (3) coupling through an electric field and a magnetic field".

Furthermore, in the foregoing preferred embodiments, the examples are described for a case in which the present invention is applied to HF-band RFID devices. However, the present invention is not limited to the HF-band RFID devices, and may be similarly applied to UHF-band RFID devices. In cases with the UHF-band, the currents flow along not only circumferences of the first booster conductor and the second booster conductor, but also a plurality of current path loops distributed over the booster conductors and electromagnetic fields are induced in such a way that a magnetic flux interlinks adjacent current loops. Furthermore, preferred embodiments of the present invention may also be applicable to systems other than an RFID system.

The power feed circuit, which is connected to the coil conductor of the antenna apparatus according to a preferred embodiment of the present invention, preferably includes, for example, a wireless IC component. The wireless IC component is typically mounted on the printed wiring board, but may alternatively be mounted on the power feed antenna.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna apparatus comprising:
a power feed antenna including a coil conductor and connected to a power feed circuit;
a first booster conductor coupled to the coil conductor of the power feed antenna through an electromagnetic field, the first booster conductor having a planar plate shape; and
a second booster conductor coupled to the first booster conductor through an electromagnetic field and coupled to the power feed antenna through an electromagnetic field.

2. The antenna apparatus according to claim 1, wherein in plan view, a first edge portion of the coil conductor overlaps a first edge portion of the first booster conductor, a second edge portion of the coil conductor overlaps a first edge portion of the second booster conductor, and a second edge portion of the first booster conductor overlaps a second edge portion of the second booster conductor.

3. The antenna apparatus according to claim 1, wherein the first booster conductor is larger than the second booster conductor.

4. The antenna apparatus according to claim 3, wherein a distance between the power feed antenna and the first booster conductor is less than a distance between the power feed antenna and the second booster conductor.

5. The antenna apparatus according to claim 1, wherein the power feed antenna, the first booster conductor, and the second booster conductor are stacked on each other in any order.

6. The antenna apparatus according to claim 1, wherein the coil conductor is a rectangular or substantially rectangular spiral conductor located on an insulating support film.

7. The antenna apparatus according to claim 1, wherein the coil conductor includes multilayered loop conductor patterns.

8. The antenna apparatus according to claim 1, wherein each of the first booster conductor and the second booster conductor includes a conducting film located on an insulating support film.

9. The antenna apparatus according to claim 1, wherein the second booster conductor is ring-shaped and overlaps one side of the coil conductor.

10. The antenna apparatus according to claim 1, wherein the second booster conductor includes a ring portion and a linearly extending portion extending from the ring portion, and the second booster conductor overlaps the coil conductor on two sides thereof.

11. The antenna apparatus according to claim 1, wherein the second booster conductor includes a ring portion and an L-shaped or substantially L-shaped portion extending from the ring portion, and the second booster conductor overlaps the coil conductor on three sides thereof.

12. The antenna apparatus according to claim 1, further comprising a capacitor connected to both ends of the coil conductor.

* * * * *